United States Patent [19]
Parr

[11] 3,995,208
[45] Nov. 30, 1976

[54] CONTROL CIRCUIT

[76] Inventor: Robert L. Parr, 6 Warrender Ave., Etobicoke, Ontario, Canada

[22] Filed: Apr. 25, 1975

[21] Appl. No.: 571,813

[52] U.S. Cl. .............................. 318/612; 318/611; 318/375; 318/379
[51] Int. Cl.² .......................................... G05B 5/01
[58] Field of Search .......... 318/611, 612, 599, 341, 318/375, 379, 282

[56] References Cited
UNITED STATES PATENTS

| | | | |
|---|---|---|---|
| 3,072,910 | 1/1963 | Snyder | 318/282 |
| 3,260,912 | 7/1966 | Gregory | 318/599 X |
| 3,281,635 | 10/1966 | Hohne, Jr. | 318/341 X |
| 3,551,773 | 12/1970 | Dannettell | 318/341 |
| 3,811,081 | 5/1974 | Abbadessa | 318/375 |

*Primary Examiner*—B. Dobeck
*Attorney, Agent, or Firm*—Rogers, Bereskin & Parr

[57] ABSTRACT

A control system for a d.c. motor, in which a cyclical d.c. drive signal is applied to the motor power input terminals as the system approaches balance. In each cycle, during at least part of the time interval between drive signal application to the motor terminals, a very low impedance (virtually a short circuit) is applied to the motor terminals. These braking pulses provide progressive braking as the motor approaches its balance point, limiting overshoot and ensuring a return without hunting from an overshoot condition to the balance point. As the system nears its deadband range, each braking pulse exceeds in duration the electrical time constant of the motor and constitutes a substantial portion of its associated cycle.

13 Claims, 15 Drawing Figures

CONTROL CIRCUIT

This invention relates to a control system for a d.c. motor or other device. The invention is particularly applicable to a position control servo which operates an electric motor for a hydraulic valve, the valve being part of the hydraulic control system of a hydraulic crane. The invention will be described with reference to its application in hydraulic cranes.

In the operation of hydraulic cranes, the need frequently arises to control from a distance the movement of the crane. Various complex systems have been developed in the past to achieve such remote control, including pneumatic systems, electric-hydraulic systems, and electro-mechanical systems employing parts such as high speed stepping motors. All such prior systems have, so far as the applicant is aware, been extremely expensive, complex, and unreliable. Because available systems are so expensive, and in many ways so unreliable, no remote control for hydraulic cranes has, so far as the applicant is aware, found wide acceptance in the market.

Accordingly, it is an object of the invention to provide an improved control system for a d.c. motor (or other power consuming device). The control system, since it is entirely electronic, is relatively inexpensive and has no mechanical parts to fail. An important feature of the invention is that it applies a cyclical d.c. drive signal to the motor, and during at least part of the time interval between each drive signal portion, as the system nears balance, a low impedance is connected across the power input terminals of the motor. Each application of the low impedance is for a length of time at least as great as the time constant of the motor, and is for a substantial portion of each cycle, as the system nears balance. The resultant braking force applied to the motor during each cycle results in better control of the state of the motor and allows higher speed operation of the servo system. Further objects and advantages of the invention will appear from the following description, taken together with the accompanying drawings, in which:

Figure 1:
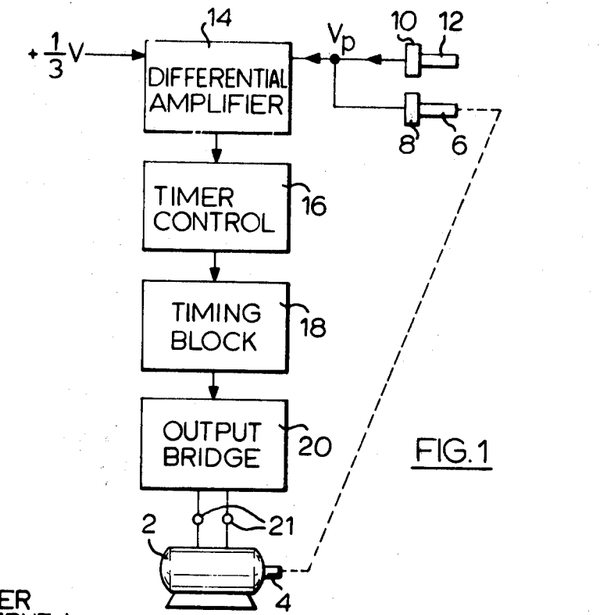
FIG. 1 is a block diagram of a preferred embodiment of the invention.

Reference is first made to FIG. 1, in which there is shown a d.c. motor 2 which is to be controlled. The output shaft 4 of the motor 2 is connected to a device to be operated by the motor, such as the control lever of a hydraulic valve (not shown). The motor output shaft 4 is also connected to the control shaft 6 of a potentiometer 8. As the motor turns, the position of the shaft 6 changes, so that the potentiometer 8 senses the position of the motor.

The control system of the FIG. 1 also includes an operator controlled potentiometer 10 having a control shaft 12. When the control shaft 12 is moved, the circuit causes the motor 2 to respond, to move the motor shaft 4 (and hence the motor shaft potentiometer 8) to a position corresponding to the new position of the operator control potentiometer 10, i.e. to a balanced condition.

As shown in FIG. 1, the signals from the potentiometers 8, 10 are combined and the resulting position signal $V_p$ fed into one side of a differential amplifier 14. The other side of the differential amplifier receives a voltage $+ \frac{1}{3}$ V (voltage $+$ V being assumed to be the supply voltage from a battery, not shown, the other side of which is grounded). So long as the system is not in balance, the differential amplifier 14 feeds an output to a timer control 16. The timer control 16 in turn controls a timing block 18, which feeds bridge control pulses to an output bridge 20. The output bridge 20 provides drive pulses to power input terminals 21 of the d.c. motor 2, to drive the motor 2 in a direction until balance is achieved.

Figure 2:
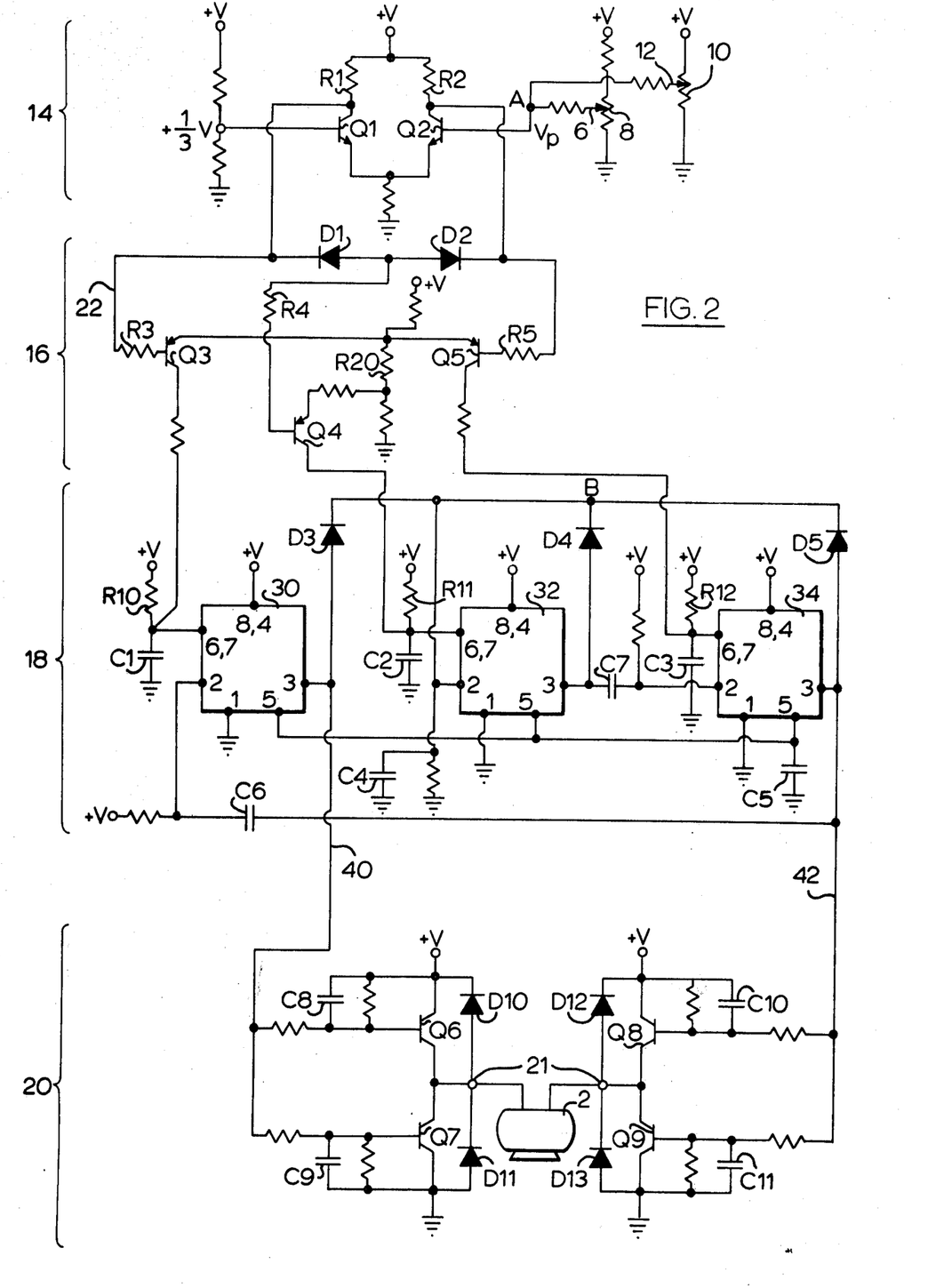
FIG. 2 is a schematic of the block diagram of FIG. 1.

The block diagram of FIG. 1 is illustrated in detail in the circuit diagram of FIG. 2. The circuit is best understood from a description of its operation, which is as follows. Assume that the operator potentiometer 10 is unbalanced so that the control shaft 12 is moved downwardly as drawn in FIG. 2. This decreases the position voltage $V_p$ at point A. The decreased positive voltage at point A is applied to the base of transistor Q2, which is connected in a differential amplifier configuration with transistor Q1. The base of transistor Q1 receives a fixed voltage, namely $+ \frac{1}{3}$ V. Transistor Q1 therefore conducts more heavily, increasing the voltage drop across resistor R1.

The increased voltage across resistor R1 is applied via conductor 22 and through resistor R3 to the base of transistor Q3. Transistor Q3 then turns on, conducting to an extent proportional to the increased voltage across resistor R1. As the voltage across resistor R1 continues to increase, transistor Q4 is also turned on, via conductor 22, diode D1, and resistor R4. The later turn-on of transistor Q4 is for a purpose to be described.

Had the operator potentiometer shaft 12 been moved upwardly as drawn in FIG. 2 instead of downwardly, then the conduction of transistor Q2 would have been increased at the expense of the conduction of transistor Q1, increasing the voltage across resistor R2, and transistors Q5 and Q4 would have turned on, instead of transistors Q3 and Q4. (The two halves of the timer control 16, i.e. components Q3, R3, and Q5, R5, are the same).

Transistors Q3, Q4 and Q5 are used to control timers 30, 32, 34 respectively in the timing block 18. Timers 30, 32, and 34 may be typically all identical monolithic timing circuits Model No. Signetics NE555 produced by Signetics Corporation of Sunnyvale, Calf. U.S.A. In FIG. 2, the numerals shown in the timer blocks are pin numbers for the timers. The timers 30, 32, 34 each operate as follows. When pin 2 of any of the timers is grounded, the timer turns on and remains on until a turn-off signal is applied to pins 6, 7. Pin 3 is the output terminal of the timer, and in the mode in which the timers are used in FIG. 2, pin 3 is grounded when the timer is off and carries a positive voltage when the timer is on. Pin 8 is connected to the positive supply voltage (pin 4 is a reset terminal which when not used is connected to the positive supply); pin 1 is the negative supply voltage terminal, and pin 5 is a separate control terminal which when not used (as is the case in FIG. 2) is connected to ground through a separate capacitor C5 in accordance with the manufacturer's recommendations.

The timers 30, 32, 34 operate in sequence. They will operate in sequence in the absence of any control signal from transistors Q3, Q4 and Q5, and only the duration of their timing intervals is affected by the signals from these transistors. The operation of the timers 30, 32, 34 is as follows.

Assume initially that all of the timers are off. Since the output pins 3 of the timers are all connected to point B, via diodes D3, D4, D5, point B is therefore grounded. Since point B is connected to the input pin 2 of the timer 32, timer 32 therefore turns on.

When timer 32 turns on, its pin 3 becomes positive, and the positive voltage is applied through diode D4 to point B, removing the turn-on signal for timer 32.

Timer 32 now conducts for a predetermined interval, determined by the time required for capacitor C2 to charge through resistor R11 to a level at which two-thirds of the positive supply voltage appears at pins 6, 7 of timer 32. At this time, timer 32 turns off.

When timer 32 turns off, a grounding pulse is applied through capacitor C7 to the pin 2 of timer 34, turning timer 34 on. (Timer 32 does not turn back on again because capacitor C4 keeps the voltage at point B positive until after timer 34 has turned on, at which time pin 3 of timer 34 applies a positive voltage to point B.) Timer 34 remains on for a predetermined interval, again determined by the value of resistor R12 and capacitor C3, and then turns off. When timer 34 turns off, a grounding pulse from its pin 3 is applied through capacitor C6 to the turn-on pin 2 of timer 30, turning on timer 30. Timer 30 in turn operates for a predetermined interval, determined by the values of resistor R10 and capacitor C1, and then turns off. When timer 30 turns off, the voltage at point B becomes ground again, turning on timer 32 and initiating a new timer cycle.

Figure 3:
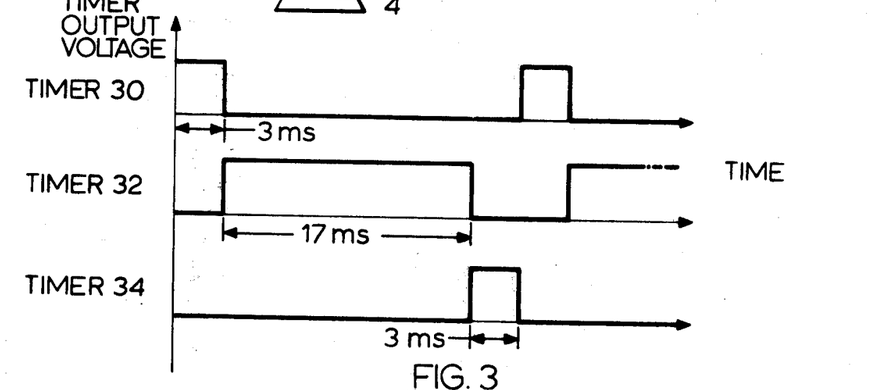
FIG. 3 shows the output of timers of the FIG. 2 circuit in a balanced condition.

The wave forms at the output pins 3 of the timer are shown in FIG. 3. In a balanced condition, the timers are adjusted so that the timing signals from timers 30, 34 are equal and of relatively short duration (e.g. 3 milliseconds), while the timing signal from timer 32 is substantially longer than those from timers 30, 34 (typically timer 32 operates for 17 milliseconds). However, the duration of the timing signals is controlled by transistors Q3, Q4, Q5, as will be explained.

The output signals from the timers 30, 34 are fed via conductors 40, 42 to act as control signals to the output bridge 20. The output bridge 20 contains 4 drive transistors Q6, Q7, Q8, Q9, connected in bridge configuration. The circuit is arranged, as shown, so that when timers 30, 34 are both off, at which time conductors 40, 42 are grounded, transistors Q6, Q8 are both biased on by the ground applied to their bases. When transistors Q6, Q8 are on and both conducting, these transistors in combination with diodes D10 and D12 present a very low impedance across motor input terminals 21, regardless of the polarity of any other signal appearing across terminals 21 (the only other signal normally appearing across terminal 21 is the back emf generated by the motor 2 and by any inductance in series with the motor). In other words, when transistors Q6, Q8 are both conducting, they provide virtually a short circuit across the motor 2, tending to brake the motor. In the balanced condition, therefore, and assuming the timing intervals shown in FIG. 2, a virtual short circuit is applied across the motor terminals 21 for 17 milliseconds of each complete timing cycle.

When timer 30 is on, a positive signal is applied via conductor 40 to the bases of transistors Q6, Q7. This turns off transistor Q6 and turns on transistor Q7. With transistors Q7 and Q8 conducting, a drive voltage is applied to terminals 21, tending to drive the motor 2 in a direction determined by the internal motor connections. However, no movement of the motor occurs, because (in the balanced condition of the circuit) timer 34 is on for an interval equal to that of timer 30. When timer 34 is on, a positive voltage is applied via conductor 42 to the bases of transistors Q8, Q9, turning transistor Q9 on and Q8 off. With transistors Q9, Q6 on, a drive voltage is applied to motor terminals 21 in the opposite direction from that prevailing when timer 30 was on, tending to drive the motor in the opposite direction. The result is that in the balanced condition, the motor typically receives in each complete timing cycle a three milliseconds duration voltage tending to drive it in one direction, a three milliseconds voltage tending to drive it in the opposite direction, and a 17 milliseconds effective short circuit across its terminals. This situation is shown in FIG. 5($a$), where the opposite drive voltages are indicated at 50, 52 and the short circuit at 54.

Figure 4:
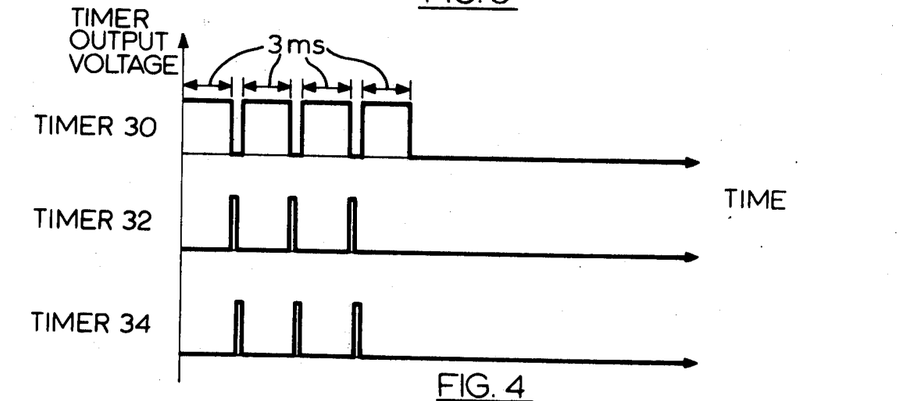
FIG. 4 shows the output of the timers of the FIG. 1 circuit in a totally unbalanced condition.
Figure 5A:
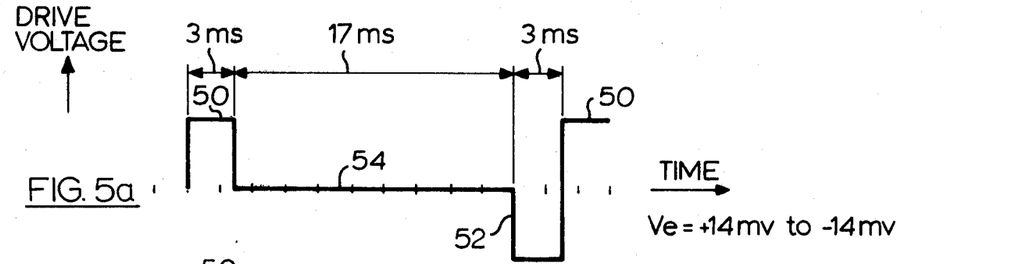
FIG. 5 shows waveforms applied to motor input terminals of the FIG. 2 circuit (one horizontal division equals 2 milliseconds)
Figures 5B, 5C:
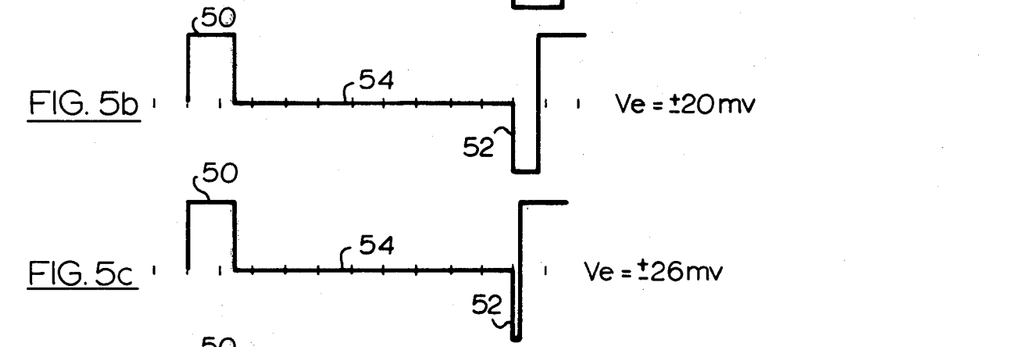
Figure 5D:
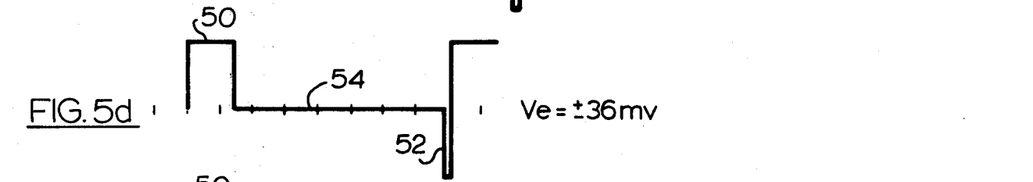
Figure 5E:
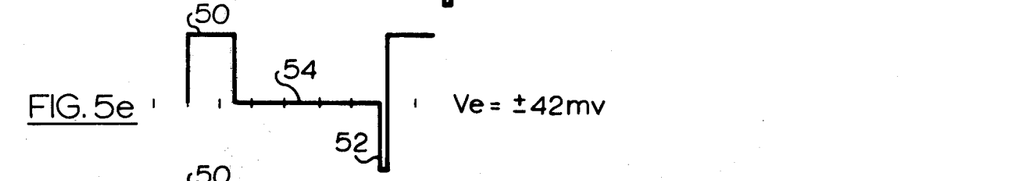
Figure 5F:
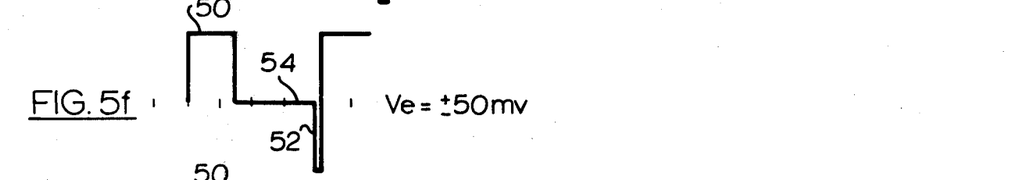
Figure 5G:
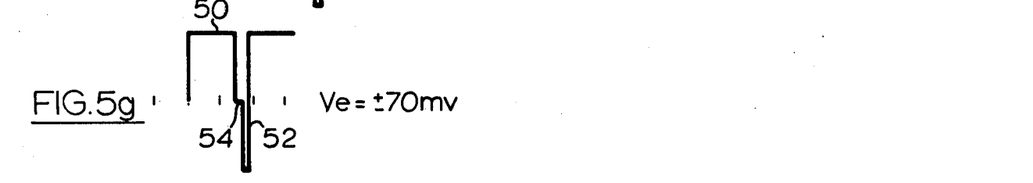

When the system becomes unbalanced, as previously described, for example by moving potentiometer shaft 12 up as drawn in FIG. 2, transistors Q5 and Q4 begin to conduct, as previously described. Transistor Q5 conducts first, taking some of the charging current of capacitor C3 which was formerly directed entirely through resistor R12. This shortens the effective charging time of capacitor C3, shortening the timing interval of timer 34. As the voltage across resistor R2 increases, and as transistor Q4 begins to conduct, it similarly shortens the charging time of capacitor C2, thereby reducing the timing interval of timer 32. The result of this, in a completely unbalanced condition, is shown in FIG. 4, in which timer 30 operates for the same timing interval as that of FIG. 3, but the timing intervals of timers 32, 34 are vastly reduced. The signals applied to the motor are shown in FIG. 5($f$), where as previously indicated, 50 and 52 represent the drive voltages and 54 the short circuit or low impedance signal.

Under these conditions, timer 30 provides its timing signal for the bulk of each complete timing cycle (in the limit, for effectively all of each timing cycle), so that transistors Q7, Q8 are on for the bulk of each timing cycle. The resultant drive signal applied to the motor 2 drives it strongly in one direction, determined by the internal connections of the motor. If the potentiometer control shaft 12 were moved in the opposite direction, then timer 34 instead of timer 30 would remain on for the longest period of time of the three timers, and the motor would be driven in the opposite direction.

Eventually, when the system reaches a balanced condition, the position voltage $V_p$ reaches $+\frac{1}{3}$ V (i.e. the biased for transistors Q1, Q2 become equal) and there is no further net drive to the motor. At this time the difference between the position voltage $V_p$, and the reference voltage $\frac{1}{3}$ V, has reached zero. This difference may be termed the error voltage $V_e$ and will be discussed in more detail shortly.

It will be noted that when the condition of the system changes from a balance to an unbalanced condition, the timing interval of timer 30 or 34 reduces before the timing interval of timer 32. The progressive reduction first of drive voltage 52 and then of the low impedance or braking interval 54 is shown in FIGS. 5(b) to 5(f). FIG. 5 also shows the error voltage $V_e$ required in a typical embodiment of the invention to produce the waveforms shown. Each division in FIG. 5 along the horizontal scale represents 2 milliseconds. The purpose of reducing the timing interval of timer 30 or 34 before that of timer 32 is to avoid wasting power, because it avoids having a sizeable portion of each timing cycle occupied by two competing drive voltages. With the arrangement as shown, the undesired drive voltage is reduced to a very short interval before the neutral portion of the cycle is reduced, so that before the desired drive voltage begins to occupy a substantial portion of each complete timing cycle, the drive voltage of undesired polarity has been essentially eliminated. This is achieved in part by resistor R20 (which is of low value, e.g. 5 to 6 ohms) which has the effect that transistor Q4 requires a higher voltage at its base to turn on than does transistor Q3 or Q5, and in part by diodes D1 and D2, which drop the voltage applied to the base of transistor Q4, so that a higher voltage is required from resistor R1 or R2 to turn on transistor Q4 than to turn on transistors Q3, Q5. The arrangement shown also allows for variations in transistor tolerances and ensures that the timing interval of timer 32 cannot reduce greatly before the timing interval of timer 30 or 34 also reduces.

Capacitors C8, C9, C10 and C11 connected across the emitter-base terminals of transistors Q6 to Q9 inclusive in the output bridge are provided to limit current and voltage spikes.

When the system is moving from a completely unbalanced condition, as indicated by FIG. 4, towards a balanced condition, as indicated by FIG. 3, the timing intervals of timers 32, 34 gradually expand. The timing interval of timer 32 expands first, for the reasons previously explained (i.e. transistor Q4 turns off before transistor Q5) and typically when the timer 32 time interval has reached its full duration (e.g. 17 milliseconds), then the timing interval of timer 34 begins to expand. The resultant effective short circuit placed across the terminals 21 of the motor 2 for an increasing portion of each complete timing cycle tends to brake the motor as it approaches its desired position, i.e. as the system approaches its balance point. The braking force applied to the motor in each cycle provides better speed control as the motor approaches the balance point, and in addition helps to ensure that the motor will not coast past the balance point. In the absence of the braking force, there would be little or nothing to stop the motor until it has reached and passed the balance point, at which time in a conventional system there would be a drive voltage tending to drive the motor in the opposite direction. (This would tend to cause hunting.) In the system described, the motor is braked progessively as it nears the balance point, helping to prevent the motor from coasting past the balance point. In some cases, depending on the momentum of the mechanism system, the motor may in fact coast past the balance point, but the extent of the overshoot is limited, and during the return in the opposite direction to the balance point, the progressive braking helps prevent a further bypass of the balance point.

The low impedance connected across the motor terminals 21 during part of each cycle will vary in value depending on the extent to which transistors Q6, Q8 and their associated diodes are turned on. These devices limit the voltage drop across the terminals 21 of the motor. For example, depending on the components used, they may limit the voltage drop across motor 2 to about 1 volt when they are fully turned on. If for example four amperes of current were being generated by the motor at this time, during its coasting, this would correspond to an impedance of about one-quarter ohm placed across the motor terminals between drive pulses. This provides substantial braking when the system is approaching its balance point. When the system is operating in a condition far from its balance point, the duration of timer 32 operation is very small as compared with the duration of operation of the timer which supplies the drive voltage and may in the limit be essentially zero, so that there is little or no braking at this time. It is found that as the system approaches its balance point, it is desirable that the braking interval during each cycle is reasonably substantial, to allow enough time for the energy stored in the motor to be dissipated to a meaningful extent. For this reason, in the embodiment illustrated, with 3 millisecond drive pulses, a 17 millisecond damping or braking interval was selected; a damping or braking interval of at least 10 milliseconds is desirable with 3 millisecond drive pulses. This arrangement was found to work well when the motor 2 was a printed circuit motor having about 50 microhenries of inductance and a circuit resistance of about 1 ohm, with a series inductor of 1 millihenry and resistance of about .07 ohms. The series inductor provides smoothing through "run-in" (to be discussed later) and may be advantageous in some applications.

Figure 6:
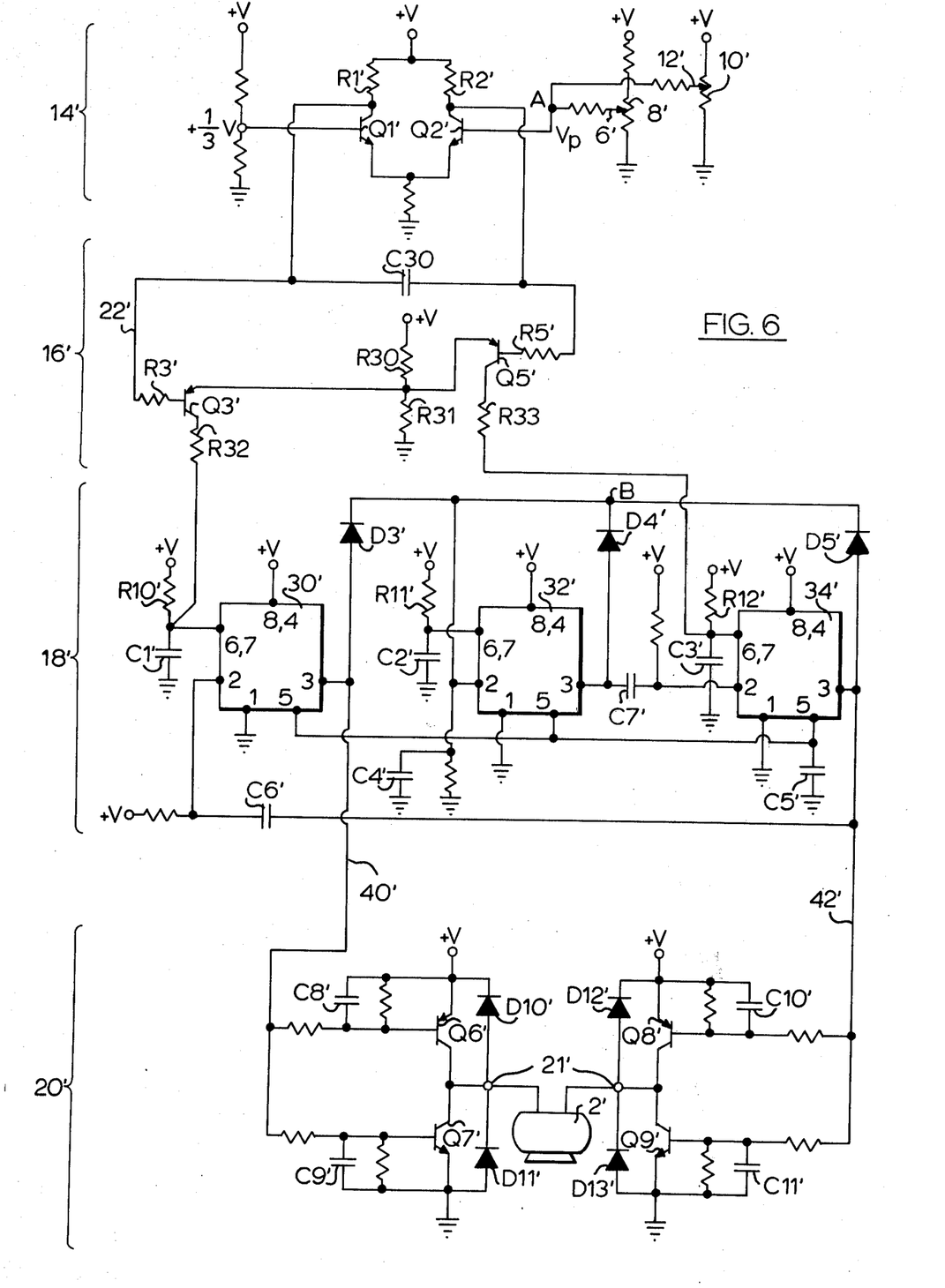
FIG. 6 shows a modification of the FIG. 2 circuit.

Reference is next made to FIG. 6, which shows a modification of the FIG. 2 circuit. In FIG. 6 primed reference characters indicate parts corresponding to those of FIG. 2. Since the FIG. 6 circuit is arranged and functions in essentially the same way as the FIG. 2 circuit, only the differences will be explained.

The FIG. 6 circuit differs from that of FIG. 2 in that the following parts of the FIG. 2 circuit have been removed: diodes D1, D2, transistor Q4 and its emitter, base and collector leads (including the resistor in the emitter lead of transistor Q4) and resistor R20. Resistor R20 is replaced by a straight lead connecting the two resistors which in FIG. 6 are marked as R30 and R31. In addition, a capacitor C30 has been added connecting the collectors of transistors Q1, Q2.

Figure 7A:
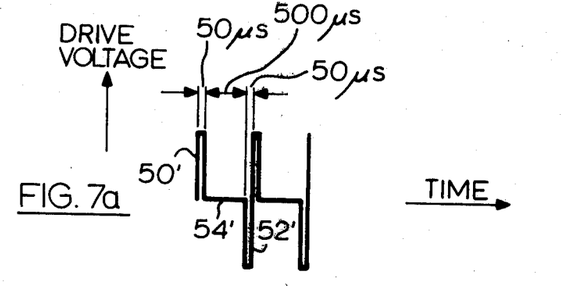
FIG. 7 shows waveforms for the FIG. 6 circuit.
Figure 7B:
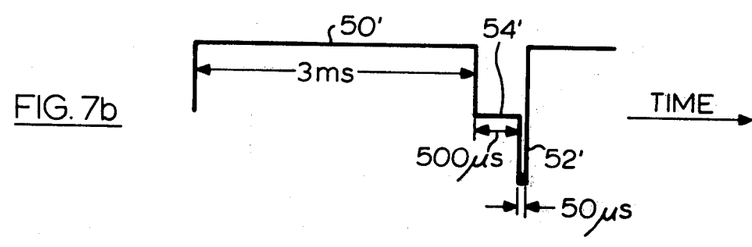

In addition, the values of the capacitor-resistor combinations for the timers 30', 32', 34' (i.e. resistor R32 and capacitor C1' for timer 30', resistor R33 and capacitor C3' for timer 34') are changed to reduce the overall length of each pulse. For example, at balance the values may be set so that the length of the damping pulse is 500 microseconds and each drive pulse is 50 microseconds. Resistors R10', R12' serve to limit the maximum on times of timers 30', 34'respectively when transistors Q3', Q5' are off. Resistors R30, R31 are set so that at balance, the voltages across resistors R1', R2', keep transistors Q3' and Q5' turned on. If an imbalance in the system occurs (i.e. an error signal is produced), this reduces the conduction of either transistor Q3' or Q5' (depending on the direction of the error). If transistor Q5' turns off, the recovery or cycle time of timer 34' expands, so that drive pulse controlled by this timer expands. The result is that at balance, there is a short damping pulse and two much shorter drive pulses. As the system goes out of balance, the desired drive pulse expands (e.g. to a duration of 3 milliseconds as before). The drive signal 50', 52' and the damping signal 54' fed to the motor are shown at balance in FIG. 7(a) and in a completely unbalanced situation in FIG. 7(b). The same printed circuit motor (50 microhenries inductance) as described in connection with FIG. 2 may be used. The series inductor will not normally be used at these operating frequencies.

The factors governing selection of pulse lengths will next be discussed in more detail. As previously indicated, it is important that the braking or damping interval during each cycle be reasonably substantial as the system approaches balance, to allow a meaningful amount of energy to be dissipated during each damping interval. However, if the drive pulses are sufficiently short as the system approaches balance, then the damping intervals may also be reduced in length, since less energy is being fed into the motor in each cycle and therefore less energy need be dissipated. In general, it is preferred, as the system nears balance, that the total time occupied by the drive pulses in each cycle be less than 50 percent of each cycle, preferably ⅓ or less of each cycle. In the FIG. 5 illustration, at balance the total time occupied by the drive pulses (6 milliseconds), with a braking pulse of 17 milliseconds, is only about 26 percent of the cycle. At a 20 millivolt error signal it is less than 22 percent of the cycle, while at 42 millivolts error signal it is still under 28 percent of the total cycle. The proportion of the cycle occupied by the preferred drive pulse of course increases as the system moves farther from balance; in the FIG. 5 example, at 70 millivolts error signal the desired drive pulse occupies about 75–80 percent of the total cycle.

In the FIG. 7 example, at balance, with two 50 microsecond drive pulses and a 500 microsecond braking pulse, the drive pulses at balance occupy less than 16 percent of each cycle and less than this when the system is slightly off balance; again, the drive pulses do not occupy a substantial proportion of each cycle until the system is far off balance.

The braking effect provided by the braking pulses of the invention can be very substantial. In one test made on a prototype system employing the printed circuit motor and inductor described above, the motor was operated under full drive, i.e. with the signal shown in FIG. 5(f), and then the signal was switched to that shown in FIG. 5(a). With the motor unloaded (i.e. driving only a gearbox and small aluminum arm), the back emf across the motor terminals was measured as about 10 volts at full speed and dropped by about half in 100 milliseconds and by a further half in another 100 milliseconds (approximately) when the signal was switched to that of FIG. 5(a). The drop in back emf was roughly exponential. When the motor is loaded, the stopping time is increased somewhat due to the load's kinetic energy. However, since the motor is usually geared down substantially and connected to the load through a gearbox, so that the load moves very slowly relative to the motor armature, the effects of the load kinetic energy are much reduced.

Although the length of the braking pulses may vary depending on the length of the drive pulses, and the mechanical and electrical characteristics of the system, nevertheless in all cases the length of the braking or damping pulses, as the system approaches balance, should be at least as great as the electrical time constant of the motor. In the example given, the printed circuit motor used had an unusually low time constant (50 microhenries divided by 1 ohm equals 50 microseconds) so very short damping pulses could be used. For an ordinary wound d.c. motor, which has much higher inductance and resistance (e.g. 1 millihenry and 1 ohm resulting in a 1 millisecond time control) considerably longer damping pulses would be needed. If the braking or damping pulses were shorter than the electrical time constant of the motor, then the braking effect would not be sufficient to be meaningful. Preferably the length of the damping pulses as the system approaches balance will be at least several times the electrical time constant of the motor and typically for better operation may be five to ten times or more as long as the electrical time constant of the motor.

The so-called "deadband" of the system will next be discussed. The main purpose of the deadhead is to take full advantage of the damping, to reduce overshoot and prevent hunting. In the example shown in FIG. 5, the drive pulse 54 begins to shrink only after the error voltage $V_e$ increases past 14 millivolts, i.e. the deadhead has a width of 28 millivolts. This allows a range in which the damping or braking pulses are at a maximum and produce a maximum braking effect. In general the deadband should not be so wide as to produce a sloppy response, but it will usually be made sufficiently wide to provide improved damping for the system. The system may be said to be in balance anywhere in the deadband range.

For smooth operation, particularly when the motor is operating e.g. a spring biased hydraulic valve, it is preferred that the damping pulses continue for a reasonably substantial extent on either side of the deadband. In the FIG. 5 example, the damping pulses constitute about 78 percent of the cycle with the error voltage $V_e$ as high as 42 millivolts; even at 52 millivolts each damping pulse constitutes about 48 percent of each cycle. This gradual reduction of the damping pulse length as the system moves away from balance, and gradual increase as the system approaches balance, helps to provide smooth acceleration and braking of the motor. Preferably the damping or braking pulses will exceed the electrical time constant of the motor over a range on each side of the deadband equal to the width of the deadband. For example, in the FIG. 5 example the width of the deadband is 28 millivolts (i.e. varying the error signal $V_e$ from zero to ± 14 millivolts produces no change in the driving or damping pulses). In that event, preferably the damping or braking pulses exceed the electrical time constant of the motor at least until the error voltage reaches ± 42 millivolts (i.e. between 50 and 150 percent of the value of the 28 millivolt deadband range), and preferably each damping pulse occupies a substantial portion, e.g. at least 30 to 50 percent, of its cycle up to or approaching the outer limit of this range.

This gradual "run-in" to the deadband has a particular advantage when the motor is used to operate a spring biased device, e.g. the spring biased plunger of a hydraulic value. This situation is shown diagrammatically in FIG. 8, which shows the motor 2 fitted with a gearbox 100 from which projects the output shaft 4. The output shaft 4 is connected to an arm 102 which is moved by the motor through an arc of about 45°. The arm 102 is connected to the plunger 104 of a hydraulic valve 106 and moves the plunger between positions A & B shown in dotted lines, corresponding to the fully open and fully closed positions of the valve. The plunger is biased to open position A by a spring 108.

Figure 8:
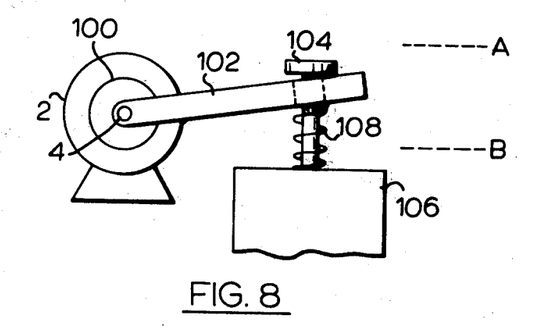
FIG. 8 shows the FIG. 2 motor connected to a spring biased hydraulic valve.

In the application shown in FIG. 8, when the operator control is set to hold the plunger 104 at a position between points A & B, the motor 2 must develop enough power to hold against the pressure of spring 108. To do this, the system reaches equilibrium (not balance) when the spring 108 pushes the motor shaft 4 to a position in which enough error signal is developed to provide enough drive to counteract the spring pressure. In other words, the system is moved out of the deadband and into the "run-in" range which leads into the deadband. If the run-in range were very short (i.e. if the braking pulses shrank to zero or nearly zero very close to the margins of the deadband range), then a powerful drive signal would be developed just outside the border of the deadband range. The motor would then force the system back into the deadband range; then the spring would force it out again, and the system would hunt. For this reason, the "run-in" range on each side of the deadband range, equal or nearly equal to the deadband range, is preferred in which the damping pulses are at least as great as the motor time constant and in which they occupy a substantial portion of each cycle.

The system described is in effect a digital-analogue system combined. If desired, a digital system could be used, in which case all pulses would be of fixed length. Damping or drive pulses would then be "expanded" simply by adding more of them, so that for example when approaching balance, there could be ten 50 microsecond drive pulses of one polarity, twenty 50 microsecond damping or braking pulses, and no drive pulses of the other polarity.

It will also be realized that it is not essential to have drive pulses in the deadband area; a continuous damping or braking signal can be provided in this region.

If desired, the braking or damping pulses can be provided by separate transistors (i.e. separate from those providing the drive pulses) which are turned on during the desired portion of each cycle to provide the desired low impedance. Various other controllable devices may be used as desired in effect to short circuit the motor terminals during the desired portion of each cycle, as the system is approaching its balance point.

Although the invention has been described for use as the control circuit for a d.c. motor, it will be appreciated that the invention may be used to provide proportional controlled power whenever such power is needed.

In the embodiment described, the amplitudes of the timer outputs are all typically the same, and the amplitudes of the opposite polarity drive voltages applied to the motor terminals 21 are also typically equal. This may however be varied as desired.

What I claim is:

1. In a control system for a d.c. motor, said motor having a predetermined electrical time constant and having power input terminals, said control system having a balanced condition and first and second unbalanced conditions one on each side of said balanced condition, the improvement comprising:
   a. means controllable for generating for application to said power input terminals a first drive signal of first polarity and a second drive signal of opposite polarity, said first drive signal tending to drive said motor from said first unbalanced condition toward said balanced condition and said second drive signal tending to drive said motor from said second unbalanced condition toward said balanced condition,
   b. means controllable for applying a low impedance to said power input terminals,
   c. means for sensing the condition of said motor and for controlling said means (a) and (b) for applying to said power input terminals,
      i. when said motor is in said balanced condition, said low impedance for at least a substantial portion of the time when said motor is in said balanced condition,
      ii. when said motor nears said balanced condition from said first unbalanced condition, a first composite signal comprising cyclically and sequentially said first drive signal and said low impedance,
      iii. when said motor nears said balanced condition from said second unbalanced condition, a second composite signal comprising cyclically and sequentially said second drive signal and said low impedance,
   d. each application of said low impedance to said power input terminals constituting a braking interval and the duration of each braking interval being at least as great as said time constant as said motor nears said balanced condition from either of said unbalanced conditions and when said motor is in said balanced condition,
   e. said means (c) including means for controlling the ratio of the duration of each braking interval to the duration of its associated cycle so that such ratio increases as said motor nears said balanced condition from either unbalanced condition, and so that the duration of each braking interval is a substantial portion of its associated cycle as said motor nears said balanced condition, whereby to brake said motor progressively as it nears said balanced condition.

2. The invention according to claim 1 wherein the duration of each braking interval is greater than 50 percent of the duration of its associated cycle as said motor nears said balanced condition.

3. The invention according to claim 1 wherein said ratio is small when said motor is far from said balanced condition and becomes progressively larger when said motor nears said balanced condition, each braking interval being greater than 50 percent of the duration of each cycle as said motor nears said balanced condition.

4. The invention according to claim 3 wherein each braking interval is of duration greater than five times the time constant of said motor when said motor nears said balanced condition.

5. The invention according to claim 3 wherein each braking interval is of duration greater than ten times the time constant of said motor when said motor nears said balanced condition.

6. The invention according to claim 1 wherein said control system includes means controllable for producing a control signal indicative of the desired condition of said motor, means responsive to the condition of said motor for producing an error signal indicative of the actual condition of said motor, said motor being in balanced condition and said error signal having a predetermined value when the actual condition of said motor corresponds to the desired condition of said motor, said means (c) including means establishing a deadband range of said error signal about said predetermined value, in which variation of said error signal does not alter signals applied to said input terminals.

7. The invention according to claim 6 wherein said ratio is small when said motor is far from said balanced condition and each braking interval is at least as long as said time constant and occupies a substantial portion of its associated cycle when said error signal has a value which differs from said predetermined value by between 50 and 150 percent of the value of said deadband range.

8. The invention according to claim 6 wherein each braking interval occupies at least 50 percent of its associated cycle and is of duration greater than five times said time constant when said error signal differs from said predetermined value by between 50 and 150 percent of the value of said deadband range.

9. The invention according to claim 8 wherein said means (c) includes means for applying to said power input terminals, when said motor is in said balanced condition, a balanced signal comprising, cyclically and sequentially, said first drive signal, said second drive signal, and said low impedance, the application times of said first and second drive signals in said balanced signal being substantially equal and each application time of said low impedance being substantially longer than the application time of said first and second drive signals.

10. The invention according to claim 9 wherein said means (c) includes means for reducing said application times of said second drive signal and of said low impedance when said motor is in said first unbalanced condition and for reducing said application times of said first drive signal and of said low impedance when said motor is in said second unbalanced condition, whereby to produce a resultant drive signal for driving said motor from an unbalanced condition to said balanced condition.

11. The invention according to claim 9 wherein said means (c) includes means for progressively reducing the application times first of one of said drive signals, then of said low impedance when the condition of said motor changes from balanced to out of balance, and for progressively increasing the application times first of said low impedance and then of the reduced drive signal as said motor is restored to said balanced condition.

12. The invention according to claim 9 wherein, when said motor is in said balanced condition, each application time of said low impedance is at least 10 milliseconds.

13. The invention according to claim 12 wherein, when said motor is in said balanced condition, each application time of a said drive signal is of the order of 3 milliseconds and each application time of said low impedance is of the order of 17 milliseconds.

* * * * *